(12) United States Patent
Bulea et al.

(10) Patent No.: US 10,642,428 B2
(45) Date of Patent: May 5, 2020

(54) ENGINEERING DISPLACEMENT RESPONSE THROUGH ELECTRODE SHAPE

(71) Applicant: SYNAPTICS INCORPORATED, San Jose, CA (US)

(72) Inventors: Mihai Bulea, San Jose, CA (US); Felix Schmitt, Oakland, CA (US)

(73) Assignee: Synpatics Incorporated, San Jose, CA (US)

(*) Notice: Subject to any disclaimer, the term of this patent is extended or adjusted under 35 U.S.C. 154(b) by 24 days.

(21) Appl. No.: 16/017,414

(22) Filed: Jun. 25, 2018

(65) Prior Publication Data
US 2019/0391684 A1 Dec. 26, 2019

(51) Int. Cl.
*G06F 3/044* (2006.01)
*G06F 3/041* (2006.01)

(52) U.S. Cl.
CPC ............ *G06F 3/044* (2013.01); *G06F 3/0414* (2013.01)

(58) Field of Classification Search
CPC ...................................................... G06F 3/044
See application file for complete search history.

(56) References Cited

U.S. PATENT DOCUMENTS

2011/0175845 A1* 7/2011 Honda ................. G06F 3/0414
345/174

* cited by examiner

*Primary Examiner* — Gustavo Polo
(74) *Attorney, Agent, or Firm* — Ferguson Braswell Fraser Kubhasta PC

(57) ABSTRACT

A method includes obtaining a capacitive function of ground plane displacement and gap distance, and optimizing, using the capacitive function, an optimization function to obtain multiple slice lengths. The slice lengths correspond to multiple gap distances between a first sensor electrode and a second sensor electrode. The method further includes defining a sensor electrode shape using slice lengths and gap distances, defining a sensor electrode pattern based on the sensor electrode shape, and storing the sensor electrode pattern.

17 Claims, 15 Drawing Sheets

ENGINEERING DISPLACEMENT RESPONSE THROUGH ELECTRODE SHAPE

FIELD

This disclosure generally relates to force sensors on electronic devices.

BACKGROUND

Many input devices, such as touchpads and touchscreens, are capable of detecting force. In order to detect force, some input device use capacitive force sensors. Capacitive force sensors include force sensor electrodes, a compressible layer, and an input surface. The force sensor electrodes, compressible layer, and input surface are arranged such that when force is applied to a surface, the compressible layer compresses. Compressing of the compressible layer causes a change in capacitance to be detected by the force sensor electrodes. Compressing of the compressible layer may also be referred to as displacement. The relationship between the amount of displacement and the amount of detected change in capacitance is displacement response. Based on the displacement response and the amount of change in capacitance detected, the input device may determine the amount of force applied to the input surface and respond according to the user's input.

SUMMARY

In general, in one aspect, one or more embodiments relate to a method that includes obtaining a capacitive function of ground plane displacement and gap distance, and optimizing, using the capacitive function, an optimization function to obtain multiple slice lengths. The slice lengths correspond to multiple gap distances between a first sensor electrode and a second sensor electrode. The method further includes defining a sensor electrode shape using slice lengths and gap distances, defining a sensor electrode pattern based on the sensor electrode shape, and storing the sensor electrode pattern.

In general, in one aspect, one or more embodiments relate to a system for engineering displacement response. The system includes a data repository for storing a capacitive function of ground plane displacement and gap distance, and a computer processor operatively connected to the data repository. The computer processor is configured to obtain a capacitive function of ground plane displacement and gap distance, and optimize, using the capacitive function, an optimization function to obtain multiple slice lengths. The slice lengths correspond to multiple gap distances between a first sensor electrode and a second sensor electrode. The computer processor is further configured to define a sensor electrode shape using slice lengths and gap distances, define a sensor electrode pattern based on the sensor electrode shape, and store the sensor electrode pattern.

In general, in one aspect, one or more embodiments relate to a capacitive input device that includes a transmitter sensor electrode, and a receiver sensor electrode. The receiver sensor electrode is parallel in a first direction to the transmitter sensor electrode. The gap distance between the transmitter sensor electrode and the receiver sensor electrode monotonically increases along the first direction of the transmitter sensor electrode and the receiver sensor electrode.

Other aspects of the technology will be apparent from the following description and the appended claims.

BRIEF DESCRIPTION OF DRAWINGS

Exemplary embodiments will be described in conjunction with the appended drawings, where like designations denote like elements.

DETAILED DESCRIPTION

The following detailed description is merely exemplary in nature, and is not intended to limit the technology or the application and uses of the technology. Furthermore, there is no intention to be bound by any expressed or implied theory presented in the preceding technical field, background, brief summary or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosure provide input devices and methods that facilitate improved usability. One or more embodiments are directed to engineering displacement response using electrode shape. Displacement response is the amount of change in detected capacitance as compared to the amount of displacement caused by force applied to an input object. When force sensor electrodes are uniformly rectangularly shaped, the displacement response function is exponential. Accordingly, a small amount of applied force may have a miniscule amount of change in capacitance, which may be undetectable after preprocessing. Because of the lack of detectability, the input device is unable to provide the correct response at low levels of applied force.

One or more embodiments are directed to changing the electrode shape to match a selected displacement response. A capacitive function is used to optimize an optimization function that matches the selected displacement response. The result of the optimization function is slice lengths for multiple slices of force sensor electrodes. Each slice corresponds to a gap distance between force sensor electrodes. Based on the result of the optimization function, a sensor electrode shape is determined and used to define a sensor electrode pattern. By using the sensor electrode pattern when building the input device, the input device is able to response as required. Thus, the input device may more accurately response to applied force.

Figure 1:
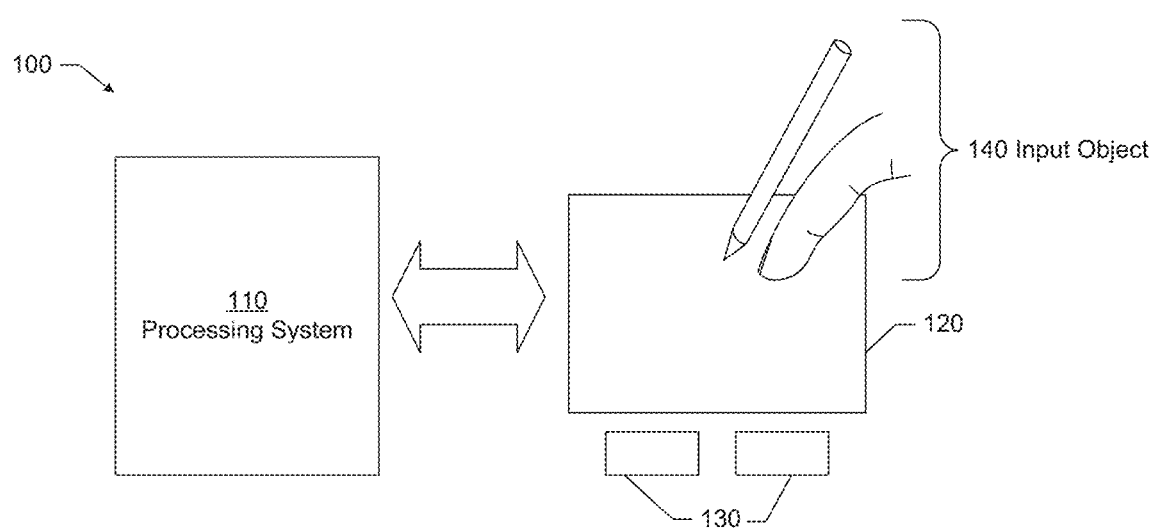
FIG. 1 shows a schematic diagram of an input device in accordance with disclosed embodiments.

Turning now to the figures, FIG. 1 shows a block diagram of an exemplary input device (100), in accordance with embodiments of the disclosure. The input device (100) may be configured to provide input to an electronic system (not shown for simplicity). As used in this document, the term "electronic system" (or "electronic device") broadly refers to any system capable of electronically processing information. Examples of electronic systems may include personal computers of all sizes and shapes (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device (100) may be implemented as a physical part of the electronic system. In the alternative, the input device (100) may be physically separate from the electronic system. In the example of FIG. 1, the input device (100) may correspond to a force sensor device or a sensor device configured to detect force caused by input objects on a surface of a sensing region. Example force sensor devices include a "touchpad" or a "touch sensor device". Example input objects include fingers and styli. The surface of the sensing region (I.e., input surface) may be provided by surfaces of a housing of the input device (100) within which the sensor electrodes reside, by face sheets applied over the sensor electrodes or any casings, etc.

The input device (100) may use capacitive sensing technologies to detect force on the sensing region. For example, the sensing region (120) may input one or more capacitive sensing elements (e.g., sensor electrodes) to create an electric field. The input device (100) may detect force based on changes in the capacitance of the sensor electrodes. Such changes in voltage and/or current may be detected as "signals" indicative of user input. The sensor electrodes may be arranged in arrays or other regular or irregular patterns of capacitive sensing elements to create electric fields.

Figure 2:
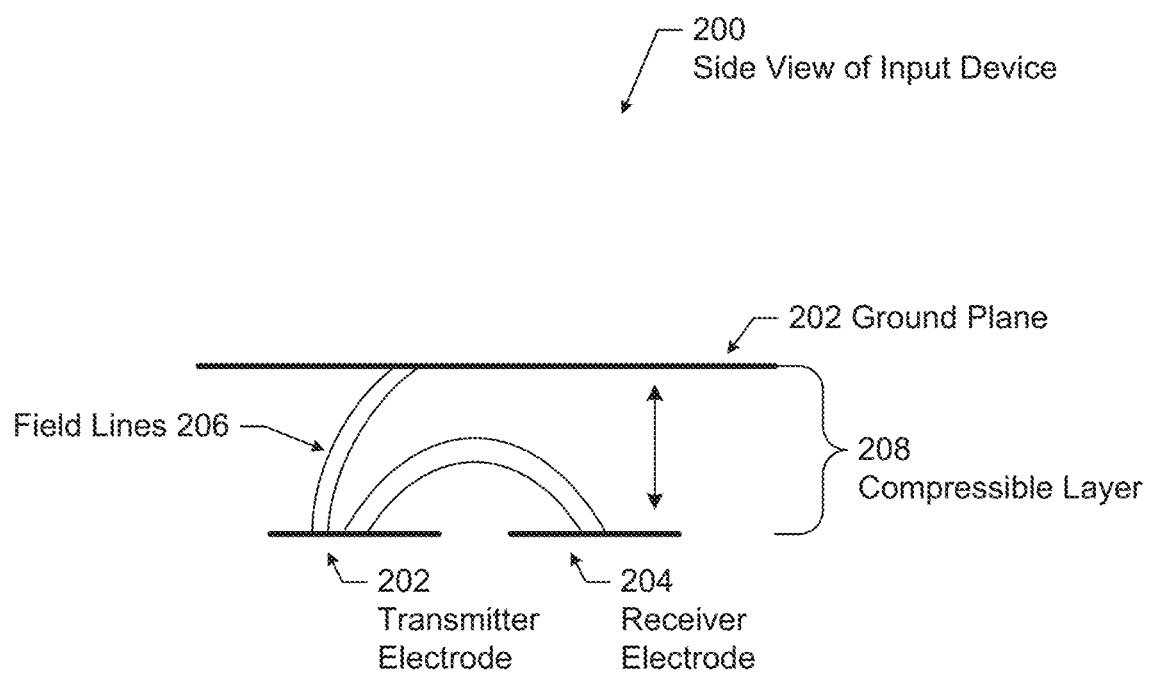
FIG. 2 shows a schematic diagram of a side view of a sensing region in accordance with disclosed embodiments.

One or more embodiments may use mutual capacitance (also referred to as "transcapacitance") sensing technologies. Transcapacitance sensing methods detect changes in the capacitive coupling between sensor electrodes. For example, the distance between the ground plane and the sensor electrodes decreases, the electric field between the sensor electrodes is altered, thus changing the measured capacitive coupling of the sensor electrodes. In some embodiments, the input device (100) may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). Signals on the transmitter sensor electrodes may be modulated relative to a reference voltage (e.g., system ground) to transmit transmitter signals while receiver sensor electrodes may be held at a substantially constant voltage relative to the reference voltage to receive resulting signals. The reference voltage may be a substantially constant voltage or may be system ground. The resulting signal may be affected by environmental interference (e.g., other electromagnetic signals) as well as force applied to the input surface, such as by input objects in contact with the input surface. Sensor electrodes may be dedicated transmitters or receivers, or may be configured to both transmit and receive. Measurements acquired using mutual capacitance sensing methods may be referred to as mutual capacitance measurements. FIG. 2 (described below) shows a schematic diagram of side view of a sensing region for transcapacitive sensing for force in accordance with disclosed embodiments.

Some capacitive sensing technologies may be based on "self capacitance" (also referred to as "absolute capacitance") and/or mutual capacitance (Also referred to as "transcapacitance"). Absolute capacitance sensing methods detect changes in the capacitive coupling between sensor electrodes and the ground plane. Absolute capacitance sensing measures the self-capacitance of the sensor electrode, where the self-capacitance is the amount of electric charge that must be added to a sensor electrode to raise the sensor electrode's electric potential by one unit (e.g., one volt). The self-capacitance of the sensor electrode changes as the ground plane moves closer to the sensor electrode. For example, the ground plane near the sensor electrodes may alter the electric field near the sensor electrodes, thus changing the measured capacitive coupling. In some embodiments, the input device (100) may implement by modulating sensor electrodes with respect to a reference voltage (e.g., system ground), and detecting the capacitive coupling between the sensor electrodes and ground plane. The reference voltage may be a substantially constant voltage, a varying voltage, or corresponds to a system ground. Measurements acquired using absolute capacitance sensing methods may be referred to as absolute capacitive measurements. In some embodiments, the sensor electrode shape is the electrode shape of the single electrode to achieve the desired response.

Continuing with FIG. 1, the processing system (110) may be configured to operate the hardware of the input device (100) to detect input in the sensing region (120). The processing system (110) may include parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes.

One or more disclosed embodiments for engineering displacement response may be implemented as a program product (e.g., software) in a variety of forms. For example, the mechanisms of the disclosure may be implemented and distributed as a software program on information-bearing media that are readable by electronic processors (e.g., non-transitory computer-readable and/or recordable/writable information bearing media that is readable by the processing system (110)). Additionally, the embodiments apply equally regardless of the particular type of medium used to carry out the distribution. For example, software instructions in the form of computer readable program code to perform embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, one or more embodiments of engineering displacement response may be performed by one or more computer processor(s) of a computing system using associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion of the disclosure may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the disclosure. For example, various components may be combined to create a single component. As another example, the functionality performed by a single component may be performed by two or more components.

Turning to FIG. 2, FIG. 2 shows a side view of an input device (200) in accordance with disclosed embodiments. As shown in FIG. 2, a ground plane (202) is located on a first layer of the input device. The ground plane (202) is electrically connected to device ground of the input device, such as via conductive traces (e.g., wire or other conductive material). For example, the ground plane (202) may be a sheet of conductive material. The ground plane (202) is parallel to the input surface (not shown). In one or more embodiments, the ground plane may be interposed between compressible layer (208) (described below) and the input surface. In one or more embodiments, the ground plane is adjacent to the input surface. In other embodiments, various electronic components may be interposed between the ground plane and the input surface.

Continuing with FIG. 2, two force sensors electrodes are shown (e.g., transmitter electrode (204), receiver electrode (206)). A force sensor electrode is any sensor electrode that is directly used for force sensing. The force sensor electrode may additionally be used for proximity sensing (e.g., detecting location of input object on or near the input surface). The transmitter electrode (204) is adjacent to a receiver electrode (206). The transmitter electrodes (204) and receiver electrodes (204) may be in single layer of the input device. For example, the transmitter electrodes (204) and receiver electrodes (204) may be both be on a same side of a substrate. The transmitter electrode (204) includes functionality to transmit signals and the receiver electrode (206) includes functionality to receive resulting signals that result from the transmission of the transmitter signals. The transmitter signals are shown as the field lines from the transmitter electrode (202) while the resulting signals are shown as the field lines to the receiver electrode (204). A compressible layer (208) is interposed between the ground plane (202) and electrodes (e.g., transmitter electrode (202), receiver electrode (204)). For example, the compressible layer (208) may be air gap and/or other elastic material. Further, the compressible layer may include springs, such as four elastic springs on the corners of the touch area. As force is applied to the input surface, at least a portion of the compressible layer (208) compresses causing the displacement between the ground plane and the electrodes to decrease. Accordingly, electric charge received by the receiver electrode (204) is reduced. As shown, more field lines are drawn toward the ground plane and fewer field lines are received by the receiver electrode (204) when the displacement between the ground plane (202) and the electrodes (e.g., transmitter electrode (202), receiver electrode (204)) decreases.

The configuration of FIG. 2 is for example purposes only. Specifically, other configurations of compressible layer, transmitter electrode, receiver electrode, and ground plane may be used without departing from the scope of the technology. Additionally, some components may be excluded without departing from the scope of the technology.

Figure 3:
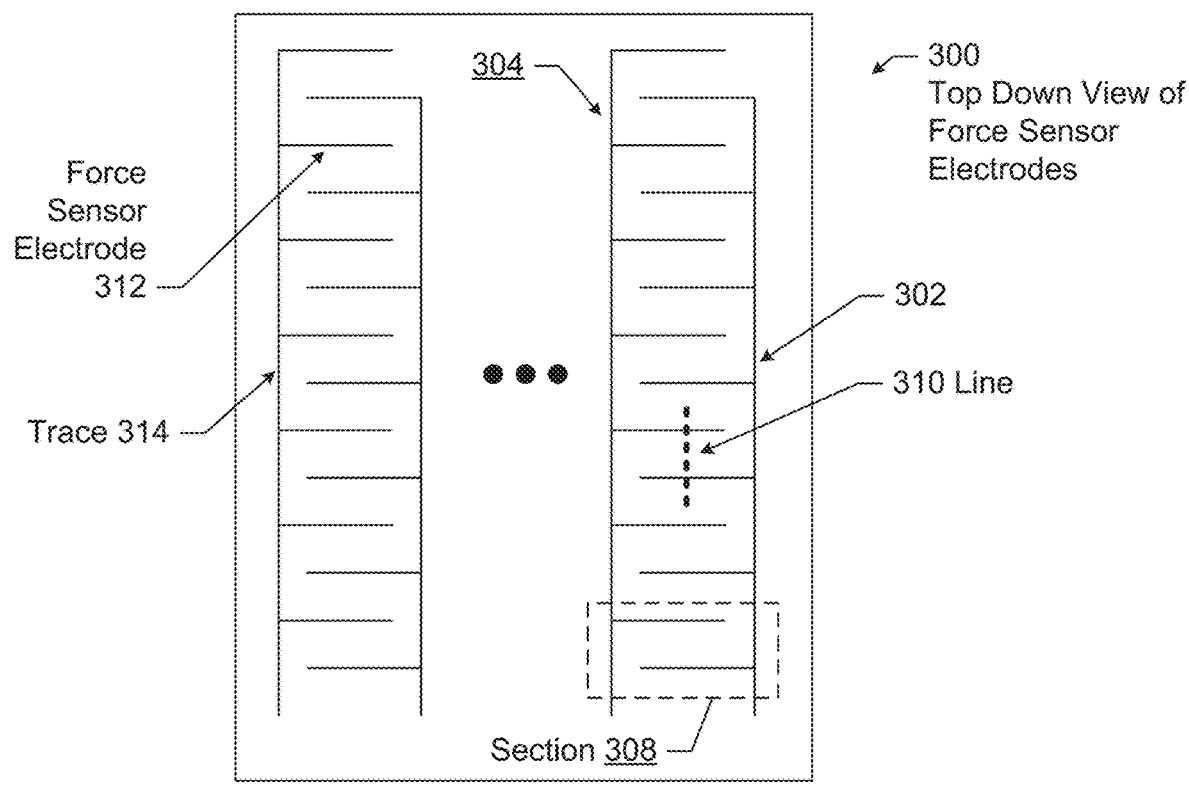
FIG. 3 shows a schematic diagram of a top down view of a sensing region in accordance with disclosed embodiments.
Figure 4:
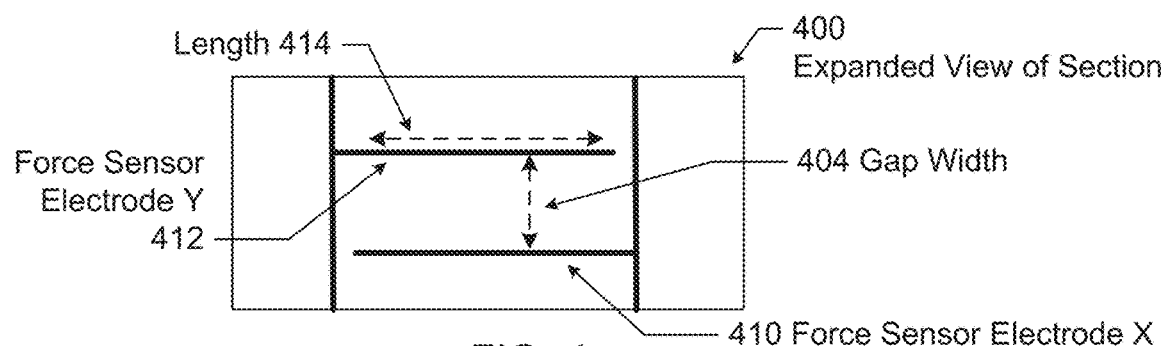
FIG. 4 shows a schematic diagram of a section of a sensing region in accordance with disclosed embodiments.
Figure 5:
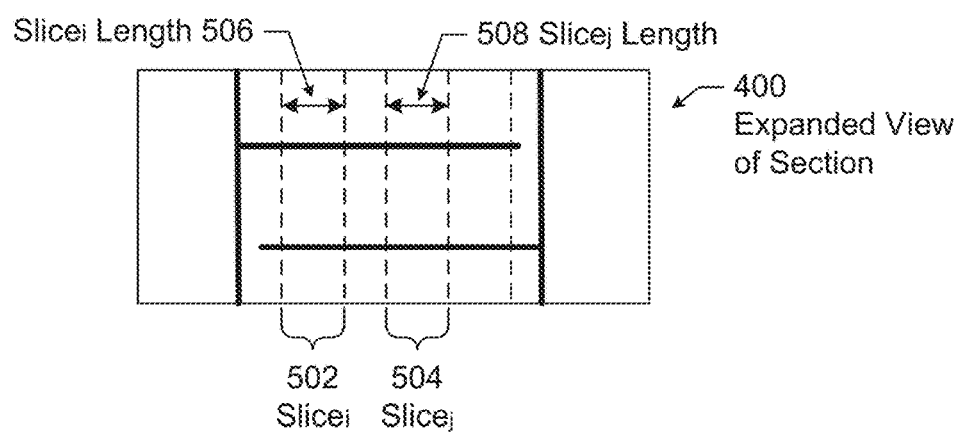
FIG. 5 shows a schematic diagram of a section of a sensing region in accordance with disclosed embodiments.

Continuing with the discussion, FIG. 3-5 present example top down views of the electrodes in accordance with one or more embodiments of the technology. Specifically, the view shown in FIGS. 3-5 is at a same angle as shown in FIG. 1 (i.e., looking down at the surface sensing region) with the input surface, ground plane and other intermediate electronic components removed. The view shown in FIGS. 3-5 is perpendicular to the view shown in FIG. 2.

FIG. 3 shows a top down view of force sensor electrodes (300) for a sensing region in accordance with one or more embodiments of the technology. The force sensor electrodes (302, 304) are arranged in a comb structure having prongs. For the purposes of the description, the prong is a force sensor electrode (e.g., force sensor electrode (312)). The force sensor electrode is made of conductive material and is connected by a conductive trace (e.g., trace (314)) to other force sensor electrodes of the same type. For example, a set of receiver electrodes may be comb structure (304) and a second set of transmitter electrodes may be comb structure (302). Two or more sets of force sensor electrodes may be arranged, such that the prongs are interleaving as shown in FIG. 3 while the conductive traces are outside of the interleaving prongs. At least one of the sets of interleaving force sensor electrodes may be transmitter electrodes, such as the transmitter electrode shown in FIG. 2, while at least one other set of force sensor electrodes is receiver sensor electrodes, such as the receiver electrode shown in FIG. 2. For example, FIG. 2 may be a side view along line (310). Instead of comb structure, each prong may be an individual force sensor electrode connected to the processing system using a unique conductive trace.

Continuing with FIGS. 3-5, FIGS. 4 and 5 show an expanded view (400) of section (308) shown in FIG. 3. The expanded view (400) may be representative of any set of adjacent force sensor electrodes of FIG. 3. As shown in FIG. 4, gap width (404) is a measurement of the amount of space (i.e., the gap) between adjacent force sensor electrodes (e.g., force sensor electrode Y (410), force sensor electrode Y (412)). Although not shown in FIG. 3, the gap width (404) may vary along the length (414) of the force sensor electrode. Where the gap width is decreased at the force sensor electrode, the width of one or both adjacent force sensor electrodes may be increased. The width direction of the width is orthogonal to the length direction (414) and along the same plane as the force sensor electrodes. Thus, the width of a force sensor electrode is orthogonal to the length of the force sensor electrode. In one or more embodiments, the gap width monotonically increases along the length direction. The monotonic increase creates a cumulative displacement response that is linear in accordance with one or more embodiments of the technology.

In some embodiments, the length of the force sensor electrodes may be adjusted. The adjustment may include the gap width constant along the length in accordance with one or more embodiments. In one or more embodiments, the adjustment may include modifying both the gap width and the length of the force sensor electrode.

Turning to FIG. 5, a force sensor electrode may be partitioned into slices (e.g., sliced (502), slice$_j$ (504)). Each slice is a contiguous section of force sensor electrode. The slice length (e.g., sliced length (506), slice$_j$ length (508)) is length along the length of the force sensor electrode. Specifically, as shown in FIG. 5, the slice length of a slice is the distance from an edge of the slice and a first adjacent slice to an opposing edge of the slice and a second adjacent slice. A slice may have a length of zero or non-zero. A length of zero means that the slice may only exist in the design and does not exist in the fabricated force sensor in accordance with one or more embodiments of the technology. Each slice may have a predefined width. The width of the slice is in the same direction as the width of the force sensor electrode. The slice length is different for adjacent slices. For example, if a first slice is adjacent to a second slice, then the first slice and second slice have different widths. The lengths of the first slice and the second slice may be the same or different.

FIGS. 3-5 are for explanatory purposes only to show various parts of sensor electrodes. The shape, size, layout, and number of sensor electrodes may change without departing from the scope of the technology.

Figure 6:
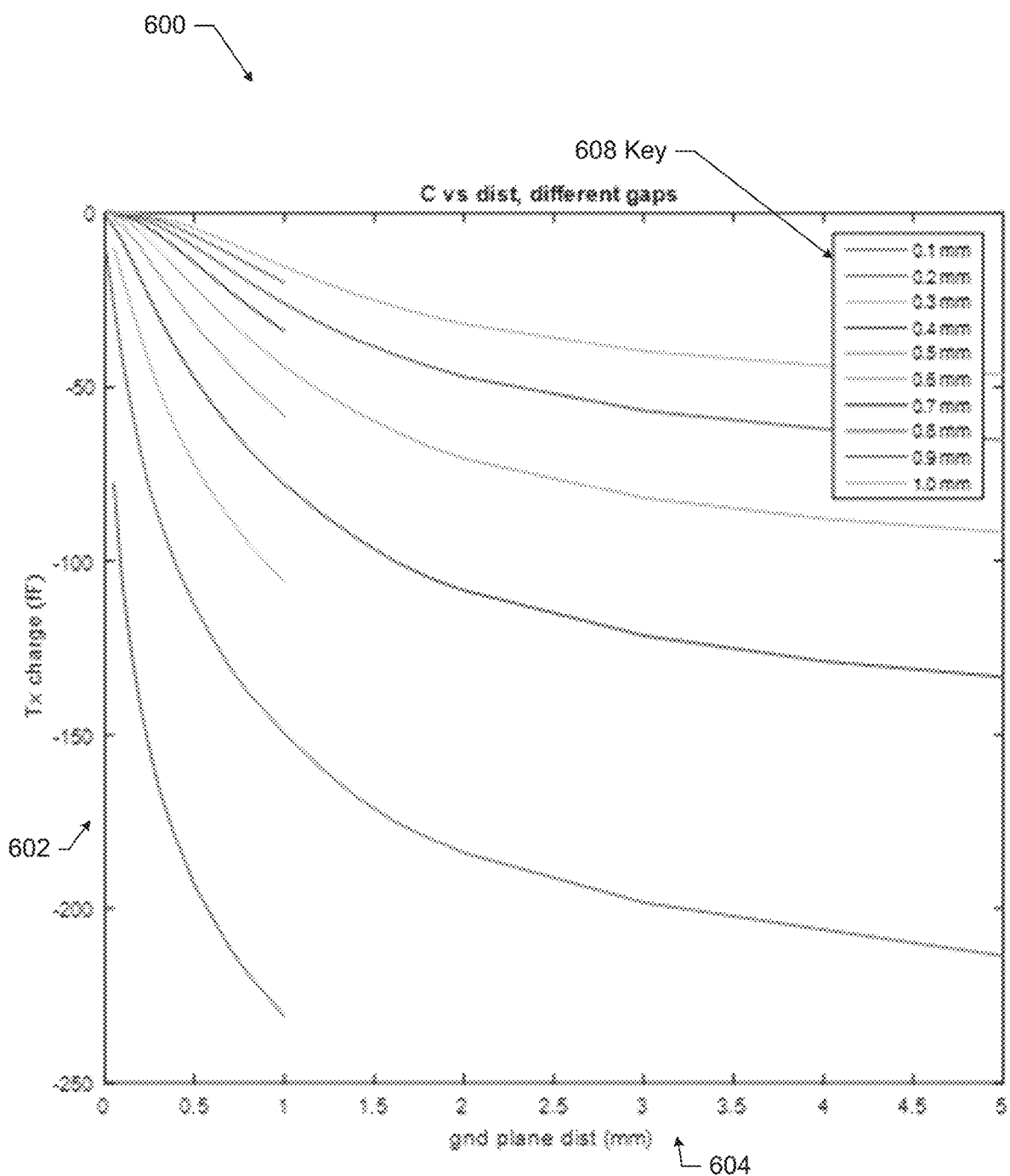
FIG. 6 shows an example graph of a capacitive function in accordance with disclosed embodiments.
Figure 7:
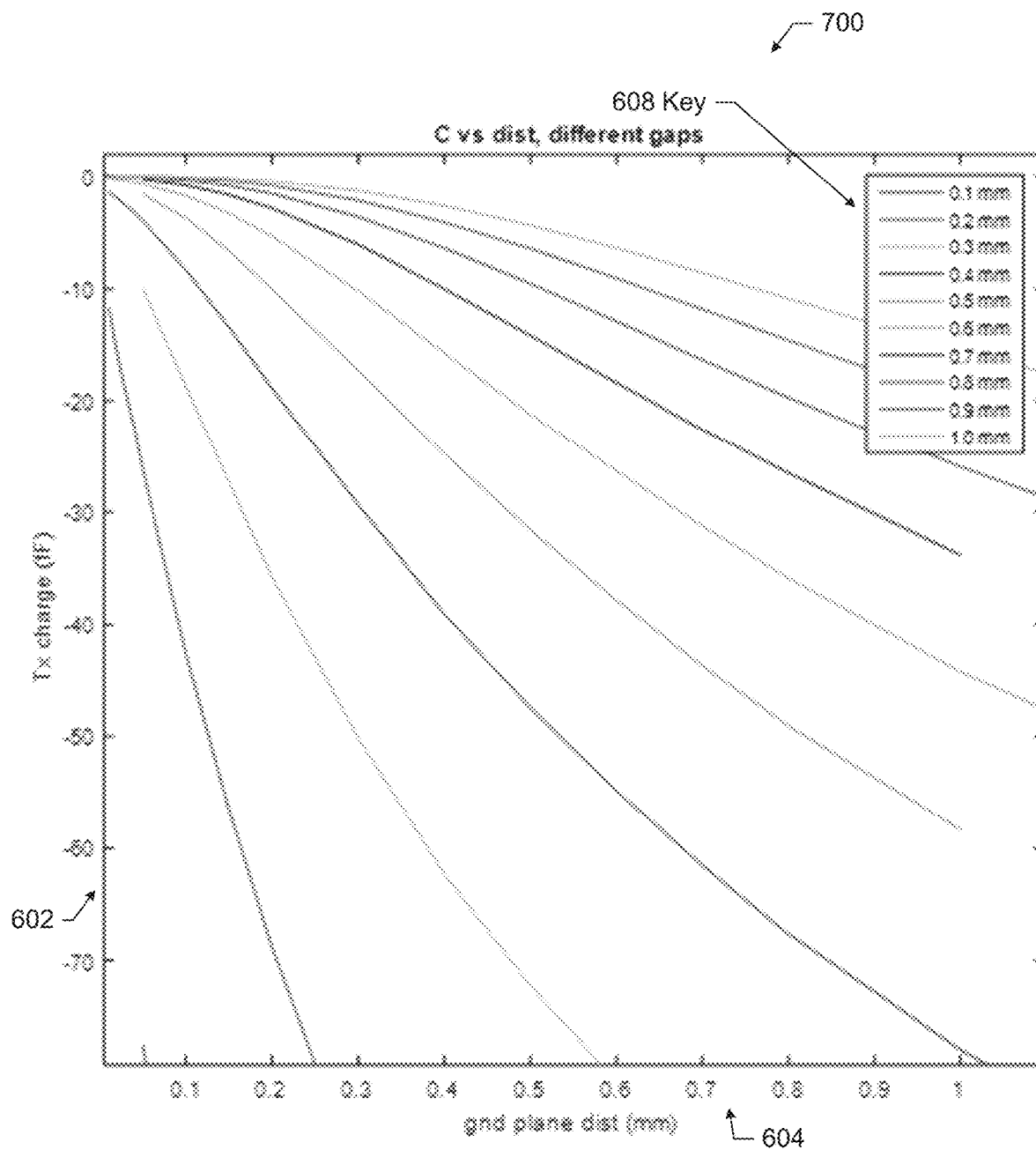
FIG. 7 shows an exploded view of the example graph of a capacitive function in accordance with disclosed embodiments.

FIGS. 6 and 7 show example diagrams of the capacitive function for force sensor electrodes in accordance with one or more embodiments of the technology. FIG. 6 shows a graph (600) of the simulation results of the change in transcapacitance as compared to displacement for different gap widths. The Y-axis (602) is the change in transcapacitance and the X-Axis (604) is the ground plane distance or displacement of the ground plane. Each line is defined for a different gap width as denoted by key (608). Specifically, each line is a unique displacement response function and corresponds to a gap width. The combination of lines forms the capacitive function of ground plane displacement, capacitive response, and gap widths. FIG. 7 shows graph (700) expanding the view of graph (600) in FIG. 6 to show a ground plane distance of 0-1.1 millimeters (mm) on the X-axis (604) and 0--80 femto Farads (fF) on the Y-Axis (602). The key (608) is the same as in FIG. 6. As shown in FIG. 6 and FIG. 7, the curvature for very large gap widths (e.g., greater than 0.6 mm) is opposite the curvature for very small gap widths (e.g., less than 0.4 mm). Thus, using different gap sizes on the same sensor pattern may be performed to superimpose curves with different curvatures. The result of superimposing different gap sizes in the same sensor pattern results in almost any desired cumulative response function.

Figure 8:
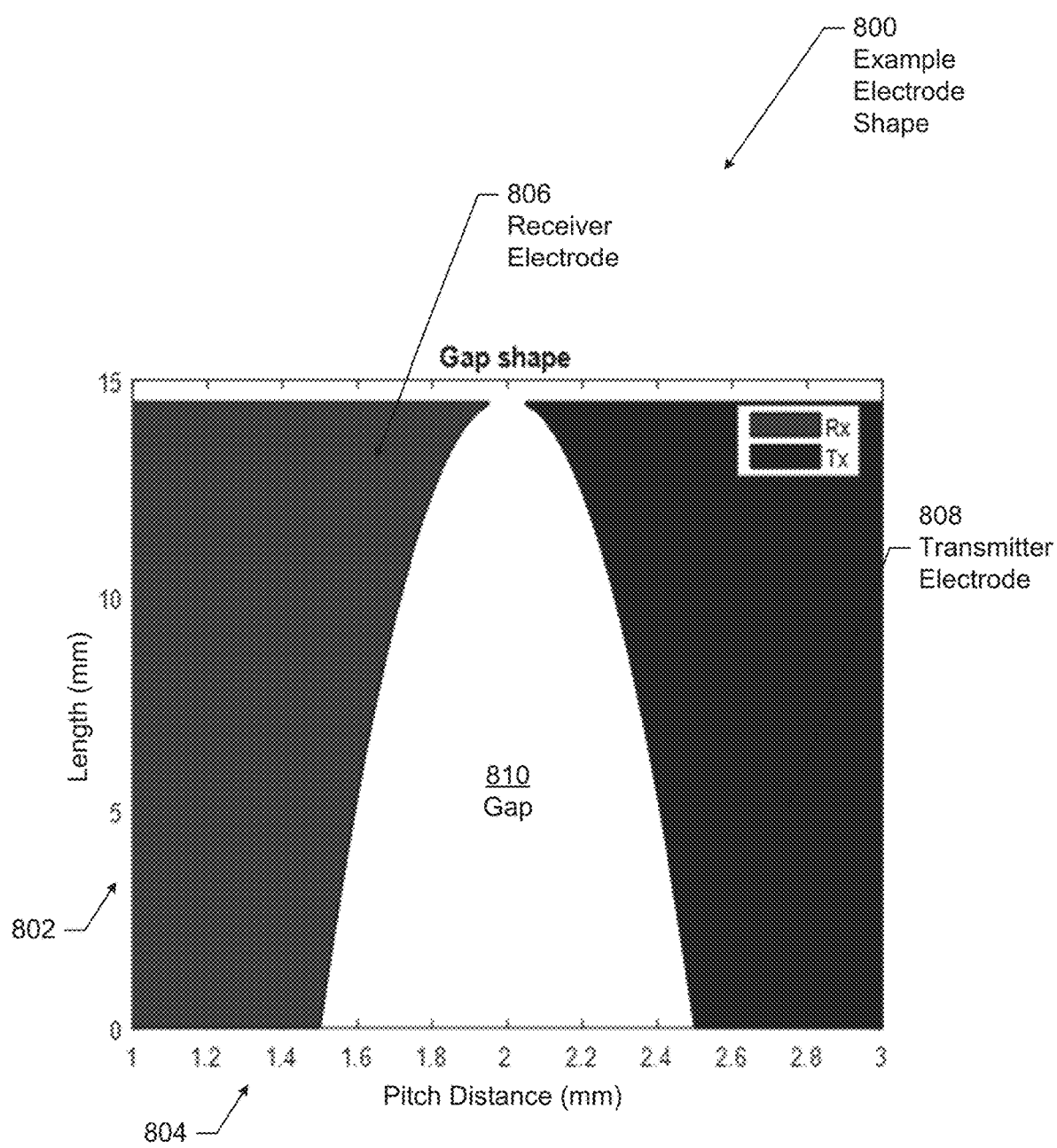
FIG. 8 shows an example electrode shape in accordance with disclosed embodiments.
Figure 9:
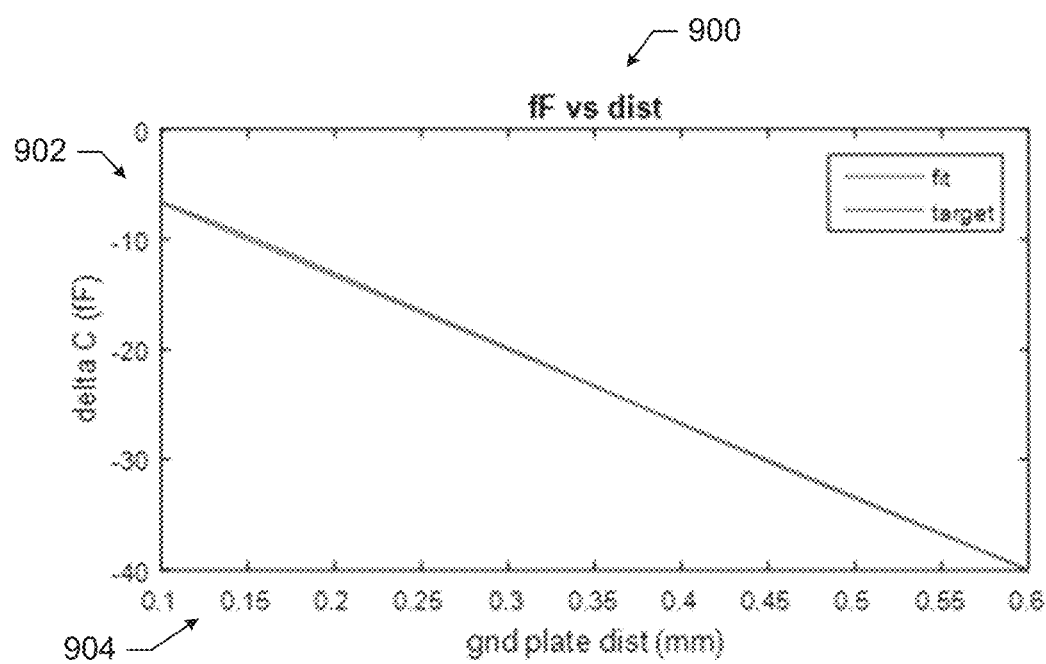
FIG. 9 shows an example graph of displacement response function in accordance with disclosed embodiments.
Figure 10:
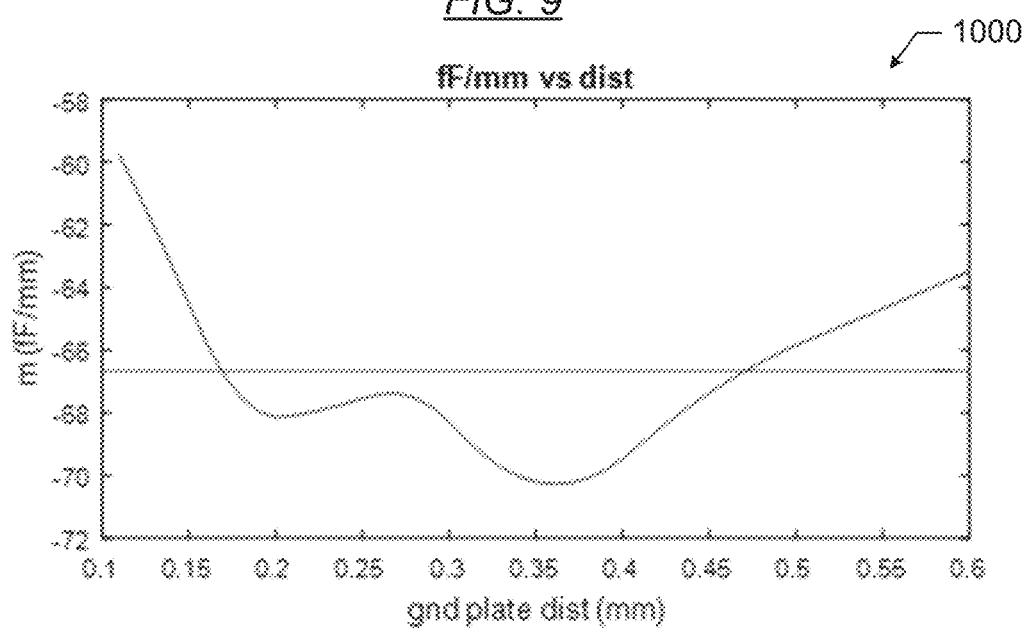
FIG. 10 shows an example graph of a derivative of a displacement response function in accordance with disclosed embodiments.

FIG. 8 shows an example gap shape (800) for achieving linear response in accordance with one or more embodiments of the technology. The Y-Axis (802) is the length in millimeters and the X-axis (804) is pitch or distance in millimeters. The left side is the receiver electrode (806) and the right side is the transmitter electrode (808). In between the receiver electrode (806) and the transmitter electrode (808) is gap (810). Using the sensor pattern of FIG. 8, the displacement response function is substantially linear. The displacement response function is shown in the graph (900) of FIG. 9, where the Y-axis (902) is the change in transcapacitance and the X-Axis (904) is the ground plane distance or displacement of the ground plane. As shown in FIG. 9, the displacement response function is a substantially linear response. The graph (1000) of the derivative is shown in FIG. 10. As shown in FIG. 10, the sensor pattern of FIG. 8 achieves a linearity of response of ±5% in the range of ground plane distances between 0.15 and 0.6 mm. By way of a comparison, with a constant 0.1 mm gap width, the derivative varies between about 80 and 500 in the range of ground plane distances between 0.15 and 0.6 mm. Thus, the capacitive response will vary by six hundred percent depending on the absolute distance of the top plane.

Figure 11:
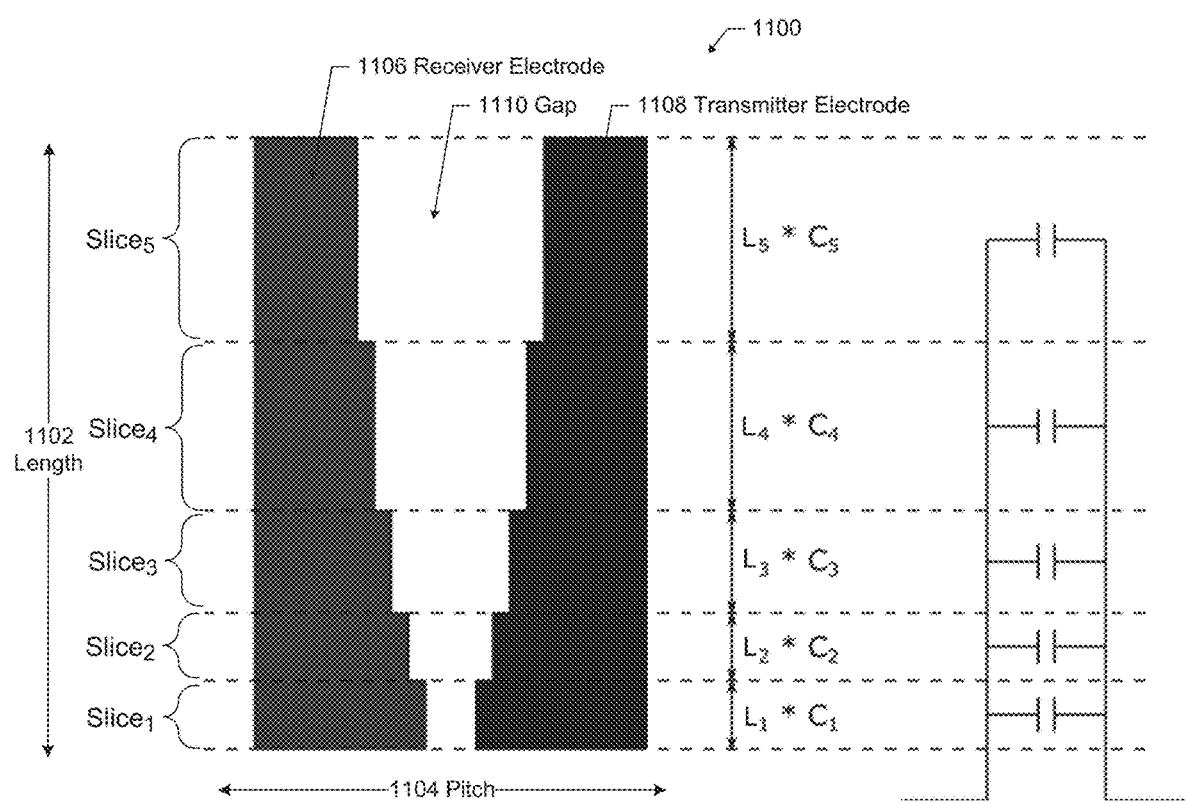
FIG. 11 shows an example of gap widths in accordance with disclosed embodiments.

Turning to FIG. 11, FIG. 11 shows an example gap shape (1100) for achieving linear response using slices. Similar to FIG. 8, the Y-Axis (1102) is the length in millimeters and the X-axis (1104) is pitch or distance in millimeters. The left side is the receiver electrode (1106) and the right side is the transmitter electrode (1108). In between the receiver electrode (1106) and the transmitter electrode (1108) is gap (1110).

In FIG. 11, slices are shown, where each slice is the portion of the electrodes between dashed lines. Each slice has a length, which is denoted by $L_i$, for i=1 . . . 5 in FIG. 11, and capacitance, which is denoted by $C_i$ for i=1 . . . 5 in FIG. 11. The cumulative capacitive response is approximated by the sum over all slices of $L_i*C_i$. The sensor electrode shapes of FIG. 11 approximate the sensor electrode shape of FIG. 8 to achieve a substantially linear response in one or more embodiments. Specifically, the displacement response function is substantially linear. Also, as shown the gap width is monotonically increasing in a single direction.

Figure 12:
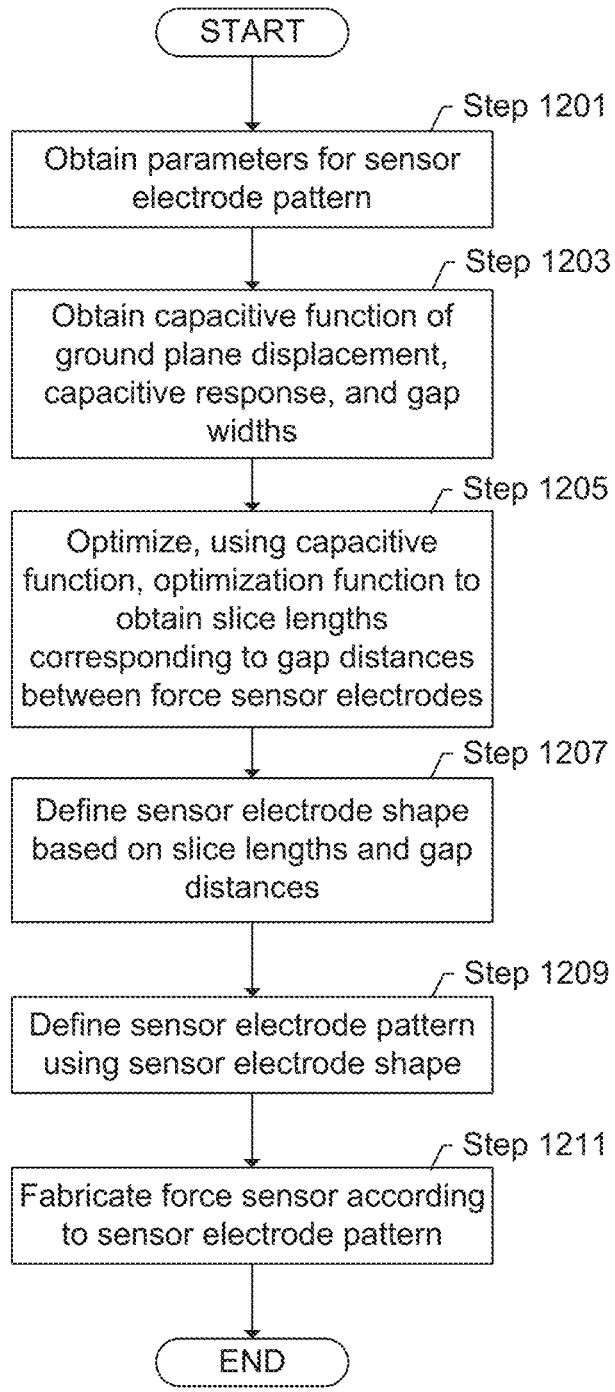
FIG. 12 shows a flowchart for engineering displacement response in accordance with disclosed embodiments.
Figure 13:
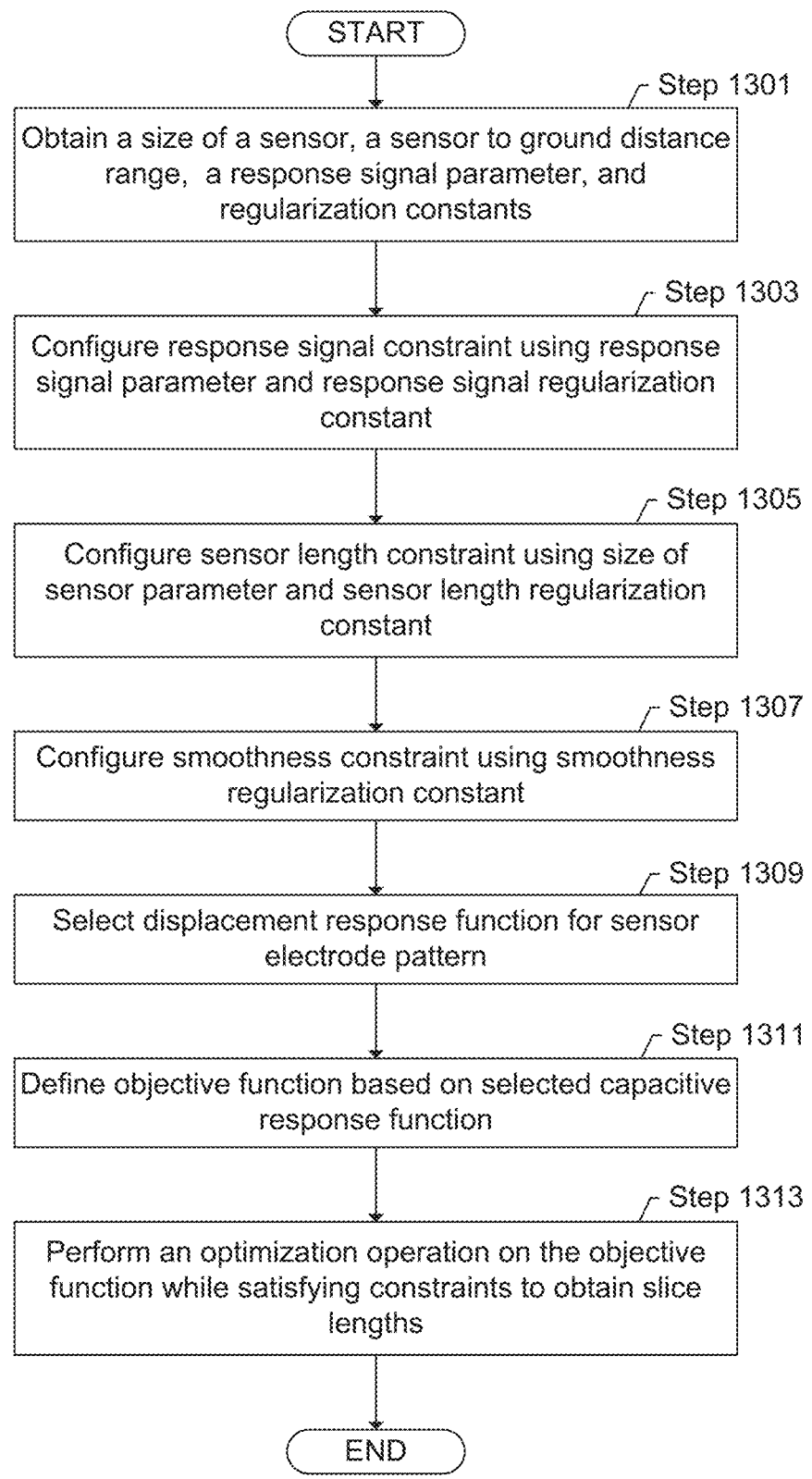
FIG. 13 shows a flowchart for optimizing the optimization function in accordance with disclosed embodiments.

Turning to FIGS. 12 and 13, FIGS. 12 and 13 show flowcharts for engineering displacement response using electrode shape. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

Turning to FIG. 12, parameters for a sensor electrode pattern are obtained in Step 1201. The parameters for the sensor electrode pattern are a set of limitations about the sensor electrode pattern. For example, the parameters may include shape, size, number of force sensor electrodes, the shape of a selected displacement response function. Obtaining the parameters may include querying a user using a graphical user interface (GUI). For example, the graphical user interface (GUI) of an input device design software application may have GUI widgets for submitting parameters. A user may select the various parameters or otherwise submit the various parameters into the corresponding fields of the GUI widget. The parameters that the user submits defines the boundaries of a sensor electrode pattern for a force sensor. By way of another example, the parameters may be obtained from an application programming interface (API). For example, the input device design application may provide the API, which is used by another software application to submit the parameters.

In Step 1203, a capacitive function of ground plane displacement, capacitive response, and gap widths is obtained. In one or more embodiments, the capacitive function is obtained experimentally. For example, one or more prototypes of a force sensor may be fabricated. Apart from gap widths, the fabricated force sensor is arranged according to a pre-defined design specification. For example, the prototypes may each be made of the same materials, have the same locations of force sensor electrodes and ground plane, and other layers as the final input device design specification. A separate prototype may be created for each gap width, where the prototype has a uniform gap width. Using a robotic device, varying levels of force may be applied to the input surface. Based on the amount of force, the amount of displacement may be calculated. Specifically, the displacement is a function of the force applied. Further, the output of the force receiver electrodes is a raw capacitive measurement value. By subtracting the raw capacitive measurement value from a corresponding baseline value, the change in capacitance is obtained. Repeating the experiment using varying levels of force on the same prototype yields a displacement response function for a gap width. Repeating the experiment across prototypes yields a capacitive function having multiple displacement response functions for varying gap widths.

In one or more embodiments, rather than or in addition to performing experiments, electrostatic field simulations may be used to obtain the capacitive function in Step 1203. For example, models of the prototypes may be computer generated. Physics based simulations may be performed on the model to model the resulting capacitance as compared to displacement for the various gap widths.

In Step 1205, using the capacitive function, an optimization function is optimized to obtain slice lengths corresponding to gap distances between force sensor electrodes. The optimization function includes an objective function and constraints. The objective function is designed to match a selected displacement response function. Specifically, if the selected displacement response function is a linear function, then the objective function is defined to calculate the residual values between output of the capacitive function and the displacement response function. The residual values are the difference between the resulting change in capacitance and the selected displacement response function. Minimizing the residual values is the objective of the optimization function in one or more embodiments. In one or more embodiments, the optimization function has constraints based on the parameters obtained in Step 1201. Various mathematical techniques for solving optimization problems may be used. For example, iterative optimization methods, such as gradient descend, or heuristic random methods, such as simulated annealing. The results of the optimization function are slice lengths.

In Step 1207, a sensor electrode shape is defined based on the slice lengths and gap distances. Each slice has a corresponding predefined gap width and location on the force sensor electrode. The location is defined relative to neighboring slices. Additionally, each force sensor electrode has a maximum width and location. For each slice having a non-zero length, the corresponding gap width reduces the maximum width of the receiver electrode and the transmitter electrode to a new width. In one or more embodiments, the amount of reduction is the same for both the receiver electrode and the transmitter electrode. For example, the receiver electrode may have a shape that is a mirror image of the transmitter electrode shape. By repeating the reduction across the slices having non-zero lengths, the sensor electrode shape is defined.

In Step 1209, a sensor electrode pattern is defined using the sensor electrode shape. The sensor electrode pattern repeats the sensor electrode shapes of the transmitter electrode and receiver electrode across the input device. Each force sensor electrode has a corresponding location and a predefined connection to a trace. The corresponding location and predefined connection may be in the predefined design specification for the force sensor. Thus, by repeating the shape of the force sensor electrode for each force sensor electrode across the force sensor, the sensor electrode pattern is defined. The sensor electrode pattern may be stored. For example, the sensor electrode pattern may be stored in memory of a computing device. As another example, the sensor electrode pattern may be presented on a computing device. For example, the sensor electrode pattern may be displayed in a graphical user interface.

As part of Step 1207 or 1209, the sensor electrode shape and/or the sensor electrode pattern may be validated. For example, experiments on a physical prototype and/or simulations on a matching model may be used to confirm that the resulting force sensor electrode complies with the selected limitation. For example, the validation may confirm that the displacement response function satisfies the selected displacement response function, the sensor length, the electrode shape, and the minimum amount of capacitive response comply with selected limitations. For example, the selected limitations may be obtained as part of Step 1201 in FIG. 12. If the validation fails, the optimization function and/or design specifications may be adjusted. Steps 1205-1209 may be repeated.

In Step 1211, a force sensor is fabricated according to the sensor electrode pattern. Specifically, conductive material in the shape of the sensor electrode pattern is affixed or deposited on substrate. The different layers of the force sensor, such as the ground plane and substrate with force sensor electrodes, may be affixed to each other according to the predefined design specification. Other techniques for physically fabricating a force sensor may be used.

FIG. 13 shows a flowchart for optimizing an optimization function for the displacement response function in accordance with one or more embodiments. In one or more embodiments, FIG. 13 expands Step 1205 of FIG. 12.

In Step 1301, a size of the force sensor, a sensor to ground distance range, a response signal parameter, and regularization constants are obtained. The size of the force sensor, the sensor to ground distance range, the response signal parameter, and the regularization constants may be obtained as part of or separate from Step 1201 in FIG. 12.

Continuing with Step 1301, the size of the force sensor is a limit on the total length of the force sensor electrode, which limits the sum of the lengths of the slices. The sensor to ground distance range is for the range of force that is applied to the input surface. Specifically, the sensor to ground distance is the distance between the force sensor electrodes and the ground plane. The range on the sensor to ground distance provides an upper bound and a lower bound on the portion of the displacement response function that should comply with the selected displacement response function. For example, the range may provide an upper and lower bound of the portion of the displacement response function that should be linear. In the example, when the distance is less than the lower bound or greater than the upper bound, then the resulting displacement response function may be nonlinear. For example, the limitation of the sensor to ground distance range may be 0.7 to 0.5 mm for a force of 0 to 10 Newtons (N).

The response signal parameter specifies a minimum slope of the displacement response function. Without the response signal parameter, optimizing the objective function may result in a zero slope, whereby for any force applied, the same capacitive response is generated. The response signal parameter may also specify a minimum capacitive response for any force within the sensor to ground distance range.

In one or more embodiments, the regularization constants define which constraints are activated. For example, the constraints on the objective function may be applied when performing the optimization operation. During different executions of optimizing the objective function, some of the constraints may be deactivated while other constraints are activated. Deactivated constraints are ignored when optimizing the optimization function while activated optimization constraints are used.

Continuing with FIG. 13, in Step 1303, the response signal constraint is configured using the response signal parameter and the response signal regularization constant. The response signal constraint is activated or deactivated using the response signal regularization constant. For example, the response signal regularization constant may be 1 to activate the response signal constraint or 0 to deactivate the response signal constraint. Further, the response signal parameter may be inserted as a constant value to the response signal constraint.

In Step 1305, the sensor length constraint is configured using the response signal parameter and the sensor length regularization constant. The sensor length constraint is a maximum value of length along the sensor electrode. The sensor length may be all or a part of the sensor size parameter value. Without the sensor length parameter, the optimization result may be a large force sensor electrode that exceeds the design specifications. The sensor length constraint is activated or deactivated using the sensor length regularization constant. For example, the sensor length regularization constant may be 1 to activate the sensor length constraint or 0 to deactivate the sensor length constraint. Further, the sensor length parameter may be inserted as a constant value to the sensor length constraint.

In Step 1307, a smoothness constraint is configured using the smoothness regularization constant. The smoothness constraint limits the shape of the force sensor electrode to be smooth rather than to have irregularities. The smoothness constraint is activated or deactivated using the smoothness regularization constant. For example, the smoothness regularization constant may be 1 to activate the smoothness constraint or 0 to deactivate the smoothness constraint. Further, the sensor length parameter may be inserted as a constant value to the sensor length constraint.

In Step 1309, a displacement response function is selected for the sensor electrode pattern. Specifically, the displacement response function is selected to satisfy a specification. The displacement response function may be selected using a GUI or API as described above with reference to Step 1201 of FIG. 12.

In Step 1311, an objective function is defined based on the selected capacitive response function. The objective function is defined to calculate the residuals between the resulting capacitive values that is output by the capacitive function and the displacement response function. For a linear response, the objective function calculates the difference between the output of the capacitive function and the displacement response function in one or more embodiments. Objective functions may be defined to be a minimization or a maximization function and achieve a same result. For example, minimizing a function f( ) is the same as maximizing the same function with minus −f( ) or even 1/f ( ). Thus, either the form of the objective function may be used.

In Step 1313, an optimization operation is performed on the optimization function while satisfying the constraints to obtain slice lengths. The optimization operation calculates slice lengths that reduces the difference between the selected displacement response function and the output of the capacitive function for various displacements between the ground plane and force sensor electrodes. The optimization operation may be performed as described above. The result of the optimization operation is slice lengths that comply with the parameters. The optimization operation may be to minimize the objective function or maximize the objective function depending on the form of the objective function.

The following example is an optimization function for having the displacement response function be a linear function.

$$\chi^2 = (1 - \alpha - \beta - \gamma)\left(\sum_x (y(x) - mx - b)^2\right) + \quad \text{(Eq. 1)}$$

$$\gamma(m - m_0)^2 + \beta\left(\sum_n l_n - L\right)^2 + \alpha\left(\sum_n \left(\phi(l_n)\ln\frac{l_n}{l}\right)^2\right)$$

In the above equation Eq. 1, $\alpha$, $\beta$, and $\gamma$ are regularization constants that turn on or off different constraints or to define the relative importance of the constraint as compared to other constraints. For example, a larger regularization constant for a first constraint as compared to the smaller nonzero regularization constant for a second constraint indicates that the first constraint has greater weight than the second constraint. Specifically, γ is a response signal regularization constant in the response signal constraint of $\gamma(m-m_0)^2$. Further, β is a sensor length regularization constant in the sensor length constraint of $\beta(\Sigma_n d_n - D)^2$. Finally, α is a smoothness regularization constant in the smoothness constraint of $$\alpha \left( \sum_n \left( \phi(d_n) \ln \frac{d_n}{d} \right)^2 \right).$$

Thus, if α is 0.001 while β and γ are 0.2, a non-smooth electrode shape may result. Further, $(\Sigma_x(y(x)-m\,x-b)^2)$ is the objective function for linear response. A set of slice lengths are selected to minimize $\chi^2$. Additionally, in the above equation, x is the displacement of the ground plane to the force sensor electrodes; in is the line slope in the displacement response function; y(x) is the output of the capacitive function with the selected displacement and a set of slice lengths (I.e., $l_n$); L is the size of sensor parameter or the maximum length; $m_0$ is the response signal parameter; b is the minimum capacitive response; and n is the slice index (I.e., slicer$_n$ has length $l_n$).

Additionally, in the above equation Eq. 1, $\phi(l_n)$ is a weighting function to identify an optimal gap that is around an optimum $1 < n_{opt} < N$. If the smoothness function constrains the beginning and end of the gap function, the gap at the beginning and end will be forced smooth. Therefore, the smoothing function without the weighting function has the unintentional consequence of requiring the gap to start at n=1 and end at n=N. The weighting function corrects the unintentional consequence. Specifically, the following weighting function in Eq. 2, $\phi(l_n)$, will weigh the center with 1 and then trail off linearly to 0 at the borders.

$$\phi(l_n) = \begin{cases} \kappa \cdot \sum_{j=1}^{n} l_j & \text{for } \sum_{j}^{n} l_j \leq \frac{1}{\kappa} \\ \kappa \cdot \sum_{j=N-n}^{N} l_j & \text{for } \sum_{j=N-n}^{N} l_j \leq \frac{1}{\kappa} \\ 1 & \text{otherwise} \end{cases} \quad \text{(Eq. 2)}$$

The factor κ>>1 determines how close to the border the weight will trail off. Using a factor of κ≈100~1000 may result in a corrected weighting function. The above function of Eq. 1 with Eq. 2 may be minimized with standard numerical optimization tools.

The above function of Eq. 1 with Eq. 2 may be described as follows. The objective function is to have a linear response whereby difference between the sensor response from the capacitive function "y(x)" and a straight line "mx+b" is minimized. The first constraint is to have a response signal which, for a linear response, means a specified slope of the response (e.g., in pF/mm). The difference between the line slope "in" and the desired slope "$m_0$" should be minimized. This is the second line in the formula, the $(m-m_0)$ term. The second constraint is that the sensor length is specified by the design specification. Namely, the sum of all the lengths of the slices should be as close as possible to the length D. NOTE: without this constrain, the solution might be a huge sensor length. The third constraint is that the shape of the sensor electrode should vary smoothly along the length. Other constraints not described above may include the minimum distance between the two force sensor electrodes. For example, if the sensor is a printed circuit board (PCB), having a minimum gap may be cheaper to produce. For example, the minimum gap may be set as 50 microns.

Figure 14:
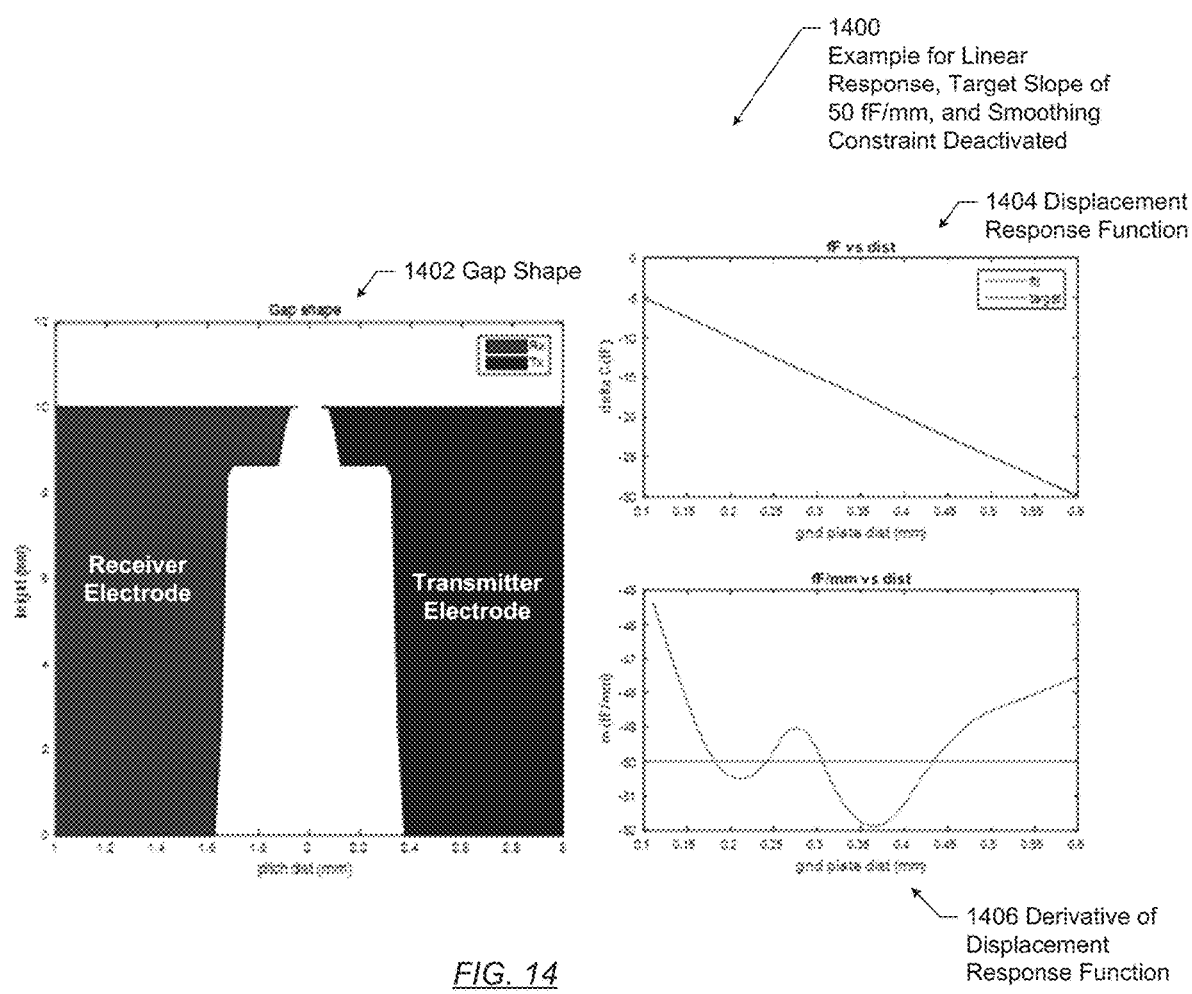
FIG. 14 shows an example electrode shape in accordance with disclosed embodiments.
Figure 15:
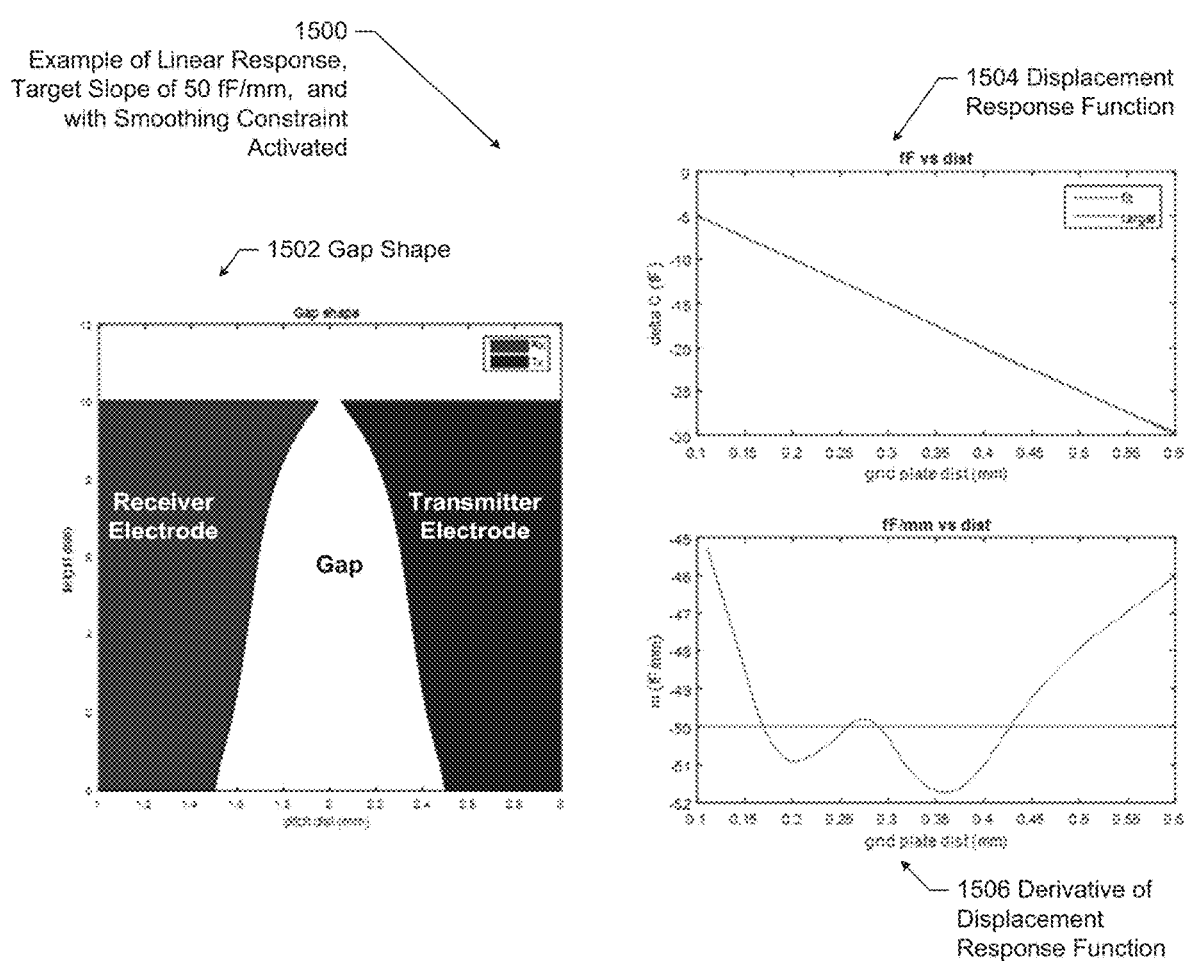
FIG. 15 shows an example electrode shape in accordance with disclosed embodiments.
Figure 16:
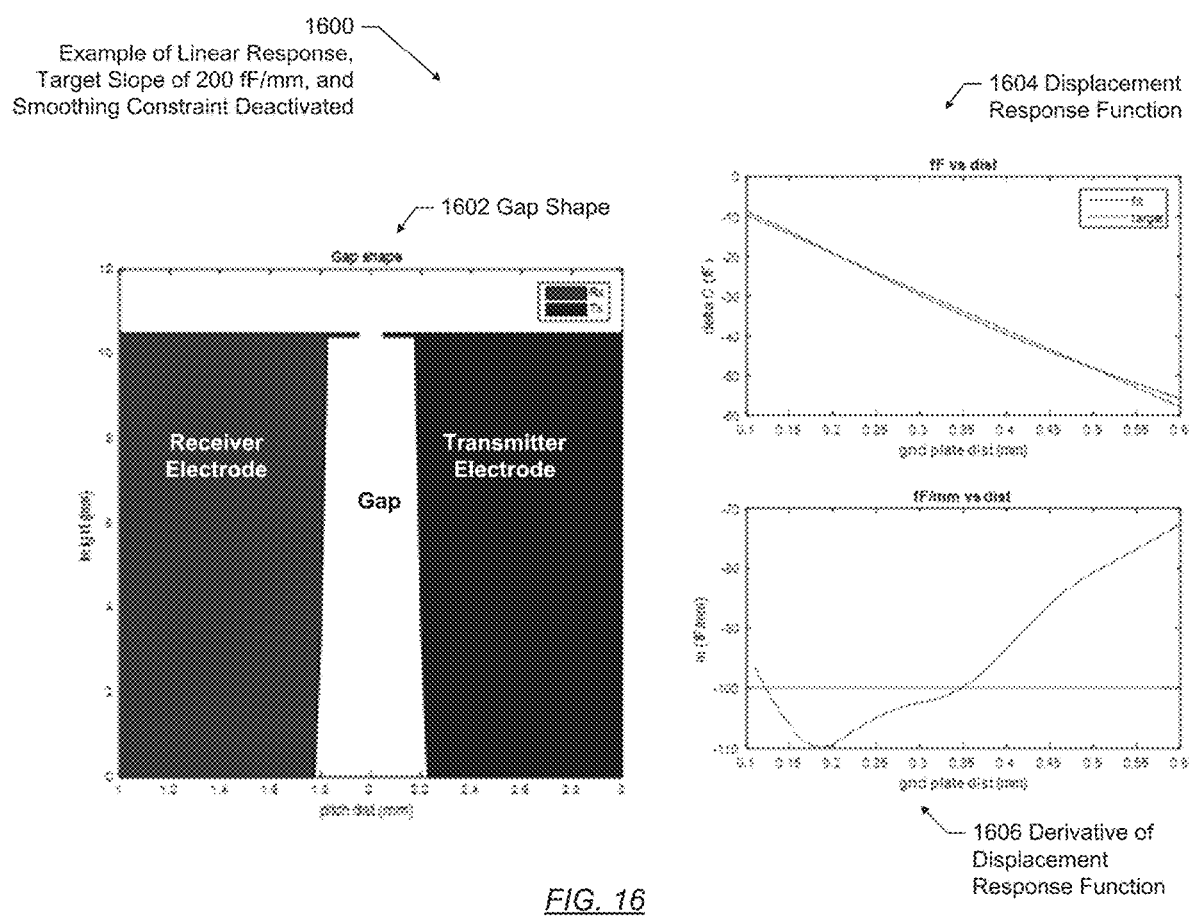
FIG. 16 shows an example electrode shape in accordance with disclosed embodiments.

FIGS. 14, 15, and 16 provide example sensor electrode shapes with gap widths and corresponding graphs that are determined using the optimization function of Eq. 1 and Eq. 2. The following examples are for example purposes only and not intended to limit the scope of the technology.

Turning to FIG. 14, FIG. 14 shows an example for linear response without smoothing constraint and a target in of 50 fF/mm. The gap shape, receiver electrode shape, and transmitter electrode shape are shown in chart (1402) where the length is along the y-axis and the pitch or width is along the x-axis. As shown, the displacement response function (1404) is linear. Also shown in a graph (1406) of the derivative of the displacement response function. The slope error is around ±5% in the distance range of 0.15-0.6 mm. The target in here is smaller than the target in FIG. 8. Further, as shown in gap shape (1402), the force sensor electrode length is enforced to be 10 mm whereas FIG. 8 had an electrode length of 15 mm. The sensor electrode shape may be built by splitting up the electrodes into two force sensor electrodes at the discontinuity and connecting the two sensor electrodes in parallel. Specifically, two receiver electrodes may be connected in parallel where the receiver electrodes together have the shape of the receiver electrode shown in FIG. 14 (i.e. one having the top part of the receiver electrode and the other having the bottom part of the receiver electrode). Further, two transmitter electrodes may be connected in parallel where the transmitter electrodes together have the shape of the transmitter electrode shown in FIG. 14.

FIG. 15 shows an example for linear response with the smoothing constraint deactivated, and a target slope of 50 fF/mm. The gap shape, receiver electrode shape, and transmitter electrode shape are shown in chart (1502) where the length is along the y-axis and the pitch or width is along the x-axis. The displacement response function is in graph (1504) and the derivative is in graph (1506). As shown, the tolerances for the capacitance slope are not much different for a very different electrode shape. Also, shape resulting from the numerical optimization is very similar to the original manual guess of FIG. 8.

Despite the differences between the force sensor electrode shape of FIGS. 14 and 15, the two force sensor electrode shapes are more similar in places where the gap is smaller. The reason for the similarity when both have smaller gap width is because the capacitance scales with the inverse of the gap distance (e.g., to the power of something greater than 1). Specifically, the smaller the gap distance, the greater the influence on the overall capacitance at that point.

FIG. 16 shows an example for linear response with smoothing constraint deactivated and with a target slope of 200 fF/mm. The gap shape, receiver electrode shape, and transmitter electrode shape are shown in chart (1602) where the length is along the y-axis and the pitch or width is along the x-axis. The displacement response function is in graph (1604) and the derivative is in graph (1606). The gap width is forced close in order to accommodate the higher required signal. With the closing of the gap width the linearity, or the amount that the displacement response function mimics a linear function, decreases. Specifically, a greater deviation exists between the displacement response function and a linear function as compared to FIGS. 14 and 15.

In one or more embodiments, the capacitance slope at 0.6 mm is not higher than the capacitance slope of the 0.1 mm constant gap case. The reason is that the constant gap case represents the absolute maximum limit of capacitance slope to be achieved.

Figure 17:
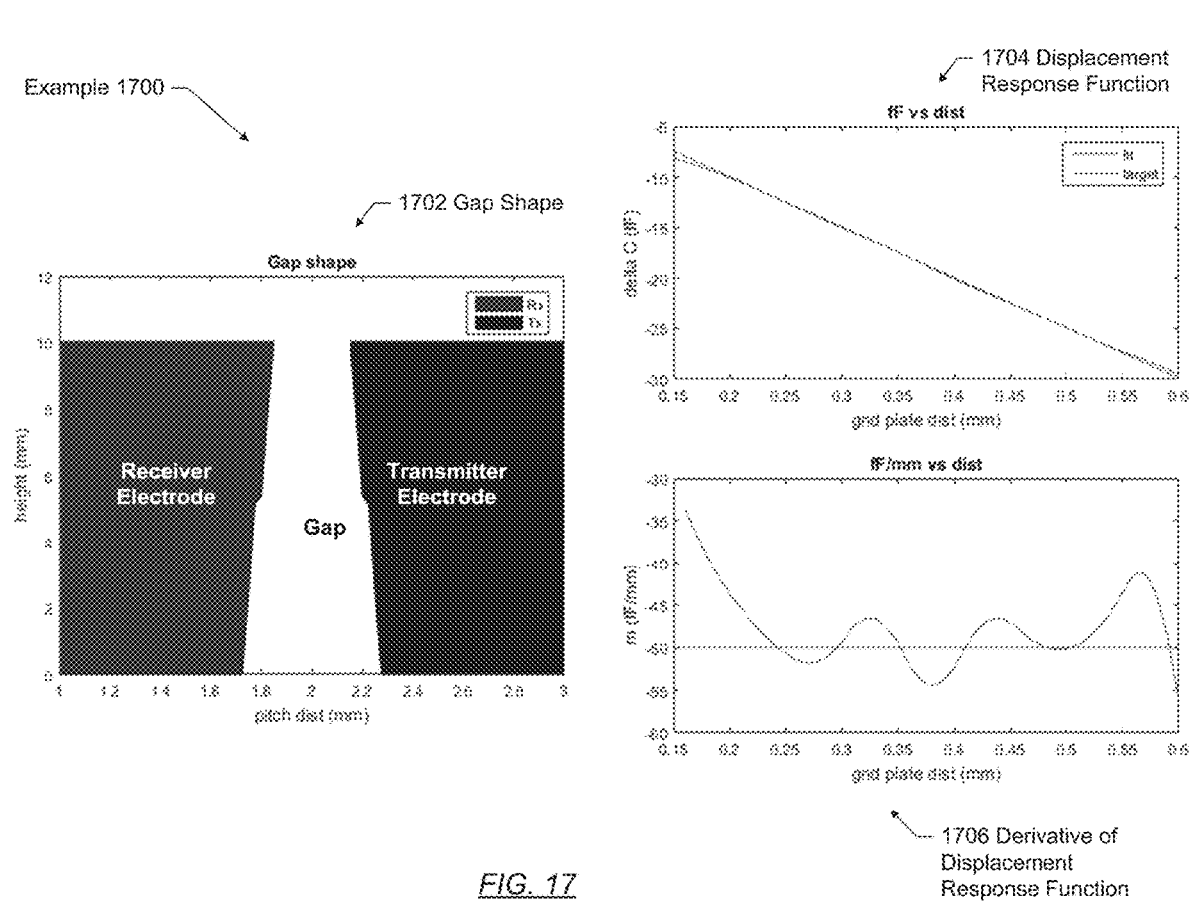
FIG. 17 shows an example electrode shape in accordance with disclosed embodiments.

FIG. 17 shows an example for linear response using Eq. 1 and Eq. 2. The pre-defined design specification has the following parameters. The substrate thickness is 125 um+25 um=150 um, the relative dielectric permittivity is 3, the center to center distance between force sensor electrodes (Rx-Tx centers) is 2 mm, the optimized (linear) target range is 0.15-6 mm, and the travel distance is 0.05-1 mm. The center to center distance specifies the predefined location of the force sensor electrodes. From simulations, around a gap width of 0.4 mm, the response is almost linear. The gap shape, receiver electrode shape, and transmitter electrode shape are shown in chart (1702) where the length is along the y-axis and the pitch or width is along the x-axis. The displacement response function is in graph (1704) and the derivative is in graph (1706).

Figure 18:
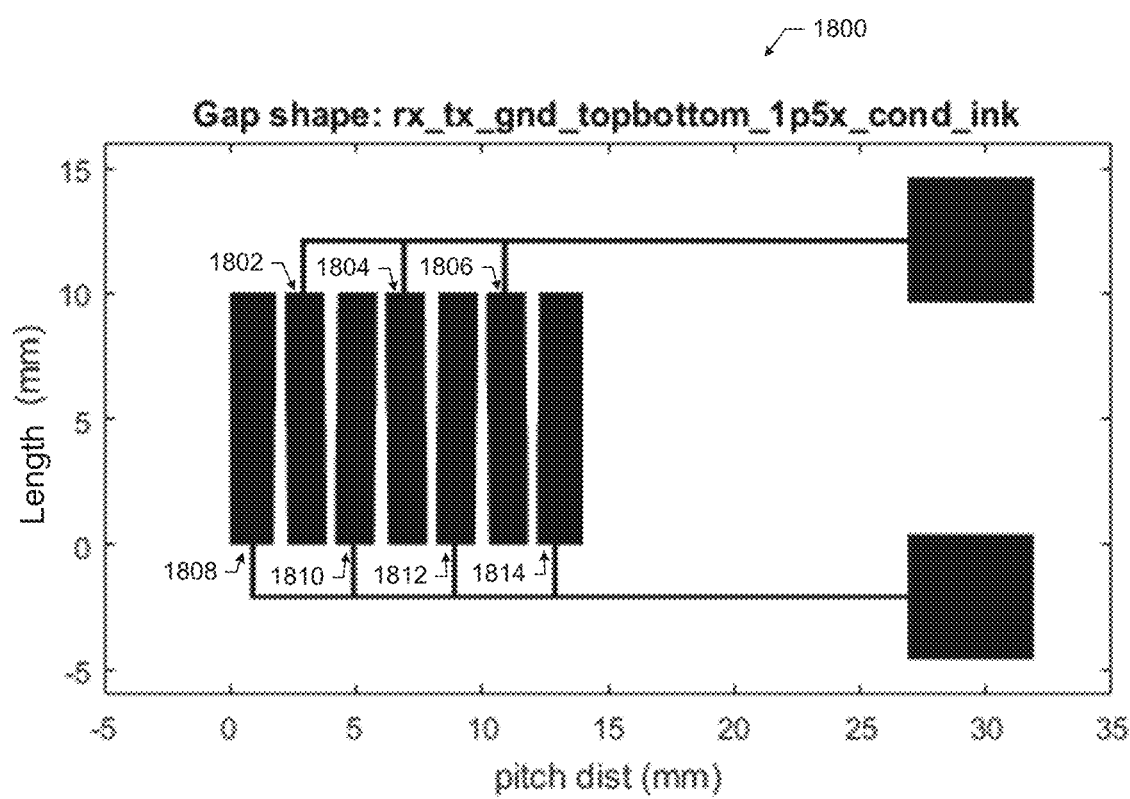
FIG. 18 shows an example electrode pattern in accordance with disclosed embodiments.

Using the gap shape of FIG. 17, the sensor electrode pattern (1800) is generated as shown in FIG. 18. In FIG. 18, three receiver electrodes (1802, 1804, 1806) are connected to the same connector pad via connected traces. The three receiver electrodes are surround on each side by four transmitter electrodes (1808, 1810, 1812, and 1814). The four transmitter electrodes are connected to the same connector pad via connected traces. The lead-ins are 0.4 mm wide and lead to connector pads. As shown in between the receiver electrodes and the transmitter electrodes, the slight gap opening from FIG. 17 exists. The gap opening in shown in the slight V shape between Rx and Tx electrodes. From the sensor electrode pattern of FIG. 18, a force sensor may be fabricated to have a linear response.

As shown, one or more embodiments provide a technique to achieve a selected displacement response function based on electrode shape. From the selected displacement response function, the force sensor electrode shape is determined and used to fabricate a force sensor. Thus, the force sensor is able to better detect force applied to the input surface.

Thus, the embodiments and examples set forth herein were presented in order to best explain various embodiments and the particular application and to thereby enable those skilled in the art to make and use the technology. However, those skilled in the art will recognize that the foregoing description and examples have been presented for the purposes of illustration and example only. The description as set forth is not intended to be exhaustive or to limit the technology to the precise form disclosed.

What is claimed is:

1. A method comprising:
obtaining a capacitive function of ground plane displacement and gap distance;
optimizing, using the capacitive function, an optimization function to obtain a plurality of slice lengths, the plurality of slice lengths corresponding to a plurality of gap distances between a first sensor electrode and a second sensor electrode, wherein the optimizing comprises:
selecting a displacement response function for the sensor electrode pattern to obtain a selected displacement response function;
defining an objective function based on the selected displacement response function; and
performing an optimization of the objective function;
defining a sensor electrode shape using the plurality of slice lengths and the plurality of gap distances;
defining a sensor electrode pattern based on the sensor electrode shape; and
storing the sensor electrode pattern.

2. The method of claim 1, further comprising:
obtaining a size of a sensor parameter; and
configuring a sensor length constraint using the size of the sensor parameter, wherein performing the optimization is to satisfy the sensor length constraint.

3. The method of claim 2, further comprising:
configuring the sensor length constraint using a sensor length regularization constant.

4. The method of claim 1, further comprising:
obtaining a sensor to ground distance range,
wherein the capacitive function uses the sensor to ground distance range.

5. The method of claim 1, further comprising:
configuring a smoothness constraint using a smoothness regularization constant, wherein performing the optimization is to satisfy the smoothness constraint.

6. The method of claim 1, further comprising:
obtaining a response signal parameter; and
configuring a response signal constraint using the response signal parameter, wherein performing the optimization is to satisfy the response signal constraint.

7. The method of claim 6, further comprising:
configuring the response signal constraint using a response signal regularization constant.

8. The method of claim 1, further comprising:
fabricating force sensor according to the sensor electrode pattern.

9. A system for engineering a displacement response comprising:
a data repository for storing a capacitive function of ground plane displacement and gap distance; and
a computer processor operatively connected to the data repository, the computer processor configured to:
obtain a capacitive function of ground plane displacement and gap distance,
optimize, using the capacitive function, an optimization function to obtain a plurality of slice lengths, the plurality of slice lengths corresponding to a plurality of gap distances between a first sensor electrode and a second sensor electrode, wherein the optimizing comprises:
selecting a displacement response function for the sensor electrode pattern to obtain a selected displacement response function,
defining an objective function based on the selected displacement response function, and
performing an optimization of the objective function,
define a sensor electrode shape using the plurality of slice lengths and the plurality of gap distances,
define a sensor electrode pattern based on the sensor electrode shape, and
store the sensor electrode pattern.

10. The system of claim 9, wherein the computer processor is further configured to:
obtain a size of a sensor parameter; and
configure a sensor length constraint using the size of the sensor parameter, wherein performing the optimization is to satisfy the sensor length constraint.

11. The system of claim 10, wherein the computer processor is further configured to:
configure the sensor length constraint using a sensor length regularization constant.

12. The system of claim 9, wherein the computer processor is further configured to:

obtain a sensor to ground distance range,
wherein the capacitive function uses the sensor to ground distance range.

13. The system of claim 9, wherein the computer processor is further configured to:
configure a smoothness constraint using a smoothness regularization constant, wherein performing the optimization is to satisfy the smoothness constraint.

14. The system of claim 9, wherein the computer processor is further configured to:
obtain a response signal parameter; and
configure a response signal constraint using the response signal parameter, wherein performing the optimization is to satisfy the response signal constraint.

15. The system of claim 14, wherein the computer processor is further configured to:
configure the response signal constraint using a response signal regularization constant.

16. A capacitive input device comprising:
a transmitter sensor electrode;
a receiver sensor electrode, the receiver sensor electrode parallel in a first direction to the transmitter sensor electrode,
wherein the receiver sensor electrode and the transmitter sensor electrode are on a single layer,
a ground plane; and
a compressible layer interposed between the ground plane and the single layer,
wherein a gap distance between the transmitter sensor electrode and the receiver sensor electrode monotonically increases along the first direction of the transmitter sensor electrode and the receiver sensor electrode.

17. The capacitive input device of claim 16, wherein compression of the compressible layer causes a substantially linear capacitive response detected using the receiver electrode.

* * * * *